United States Patent [19]

Bates et al.

[11] Patent Number: 5,000,140
[45] Date of Patent: Mar. 19, 1991

[54] ISOLATED THRUST PIN FOR USE WITH A ROTATING SHAFT

[75] Inventors: Kent C. Bates, Chillicothe; Nelson A. Jones, Peoria, both of Ill.

[73] Assignee: Caterpillar Inc., Peoria, Ill.

[21] Appl. No.: 424,785

[22] Filed: Oct. 20, 1989

[51] Int. Cl.$^5$ ............................................. F02B 75/06
[52] U.S. Cl. .................................. 123/192 B; 74/603; 384/420
[58] Field of Search ............................... 384/420, 424; 123/192 B; 74/589, 603, 604; 403/324, 378, 379

[56] References Cited

U.S. PATENT DOCUMENTS

| | | | |
|---|---|---|---|
| 2,359,180 | 9/1944 | Williams | 74/574 |
| 2,614,897 | 10/1952 | Kircher et al. | 308/35 |
| 3,619,015 | 11/1971 | Goossens | 384/420 |
| 4,425,821 | 1/1984 | West | 74/604 |
| 4,508,069 | 4/1985 | Dobler et al. | 123/192 |
| 4,523,553 | 6/1985 | Backlund | 123/192 B |
| 4,703,725 | 11/1987 | Weertman | 123/192 B |
| 4,741,303 | 5/1988 | Kronich | 123/192 |
| 4,781,156 | 11/1988 | Berger et al. | 123/192 R |
| 4,819,505 | 4/1989 | Takubo et al. | 74/603 |

FOREIGN PATENT DOCUMENTS 1295286  5/1969  Fed. Rep. of Germany .

*Primary Examiner*—Noah P. Kamen
*Attorney, Agent, or Firm*—Larry G. Cain

[57] ABSTRACT

Balancing devices or systems have been used to compensate for the periodic unbalanced forces generated by the reciprocating movement of the piston and connecting rod assemblies of an engine. These devices in the past have reduced serviceability, increased engine component complexity, increased cost and have reduced reliability. The subject device provides a simple, inexpensive, more serviceable and reliable balancing system. A plurality of individual bearing supports are removably attached to the engine, a pair of balancing shafts are rotatably positioned in the supports and a thrust pin is isolatingly mounted between the support and the shaft. A pair of o-rings are mounted about each end of the pin and is positioned in the support at least partially isolating the pin from the engine. The center of the pin has a plurality of seating surfaces thereon which have an oil film between the seating surfaces and a groove in the shaft. The balancing system is separate from the engine and can be easily added or removed. Thus, the system isolates the axial loads from the engine to the balancing system and is simple, inexpensive and reliable.

22 Claims, 4 Drawing Sheets

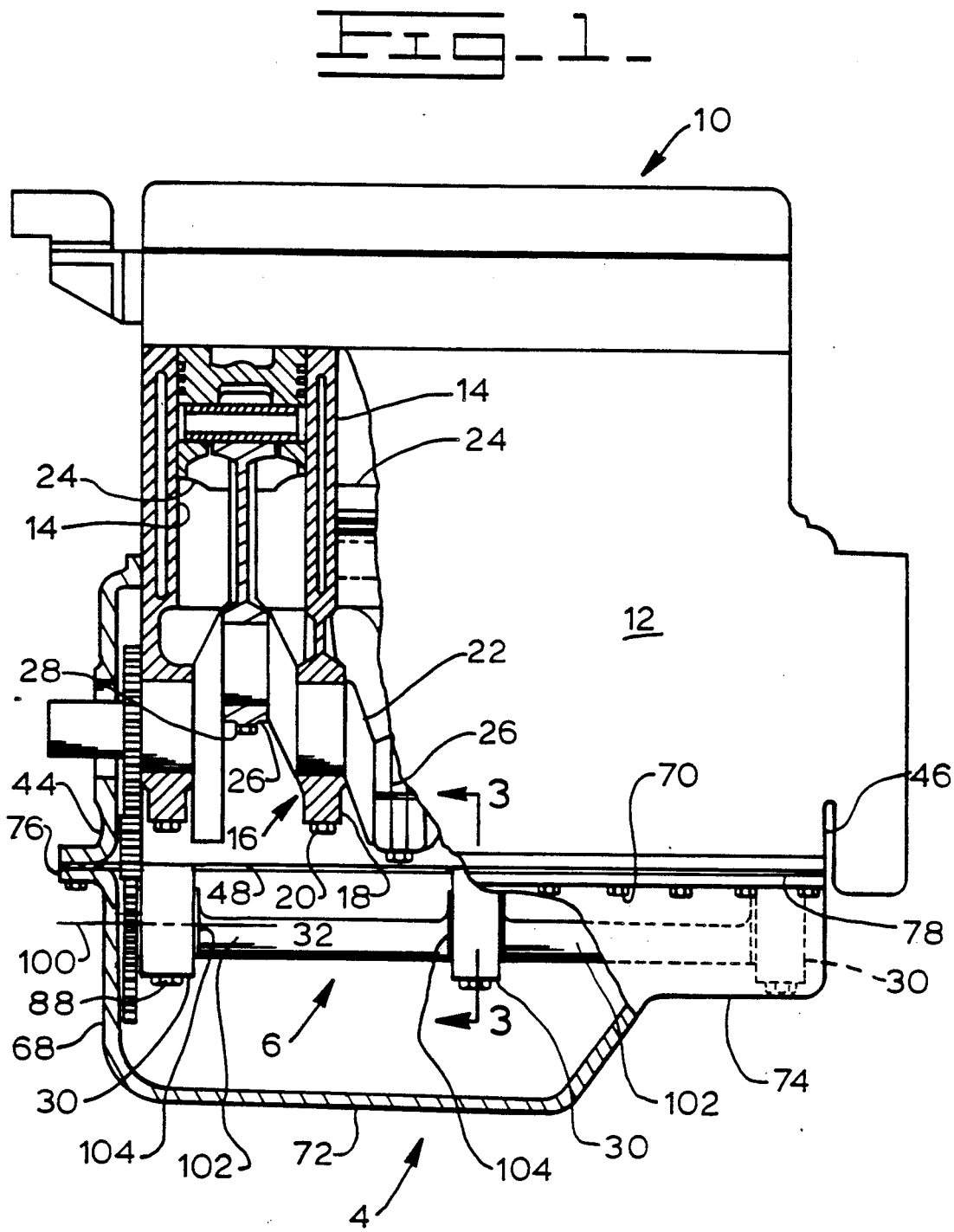
Fig_1_

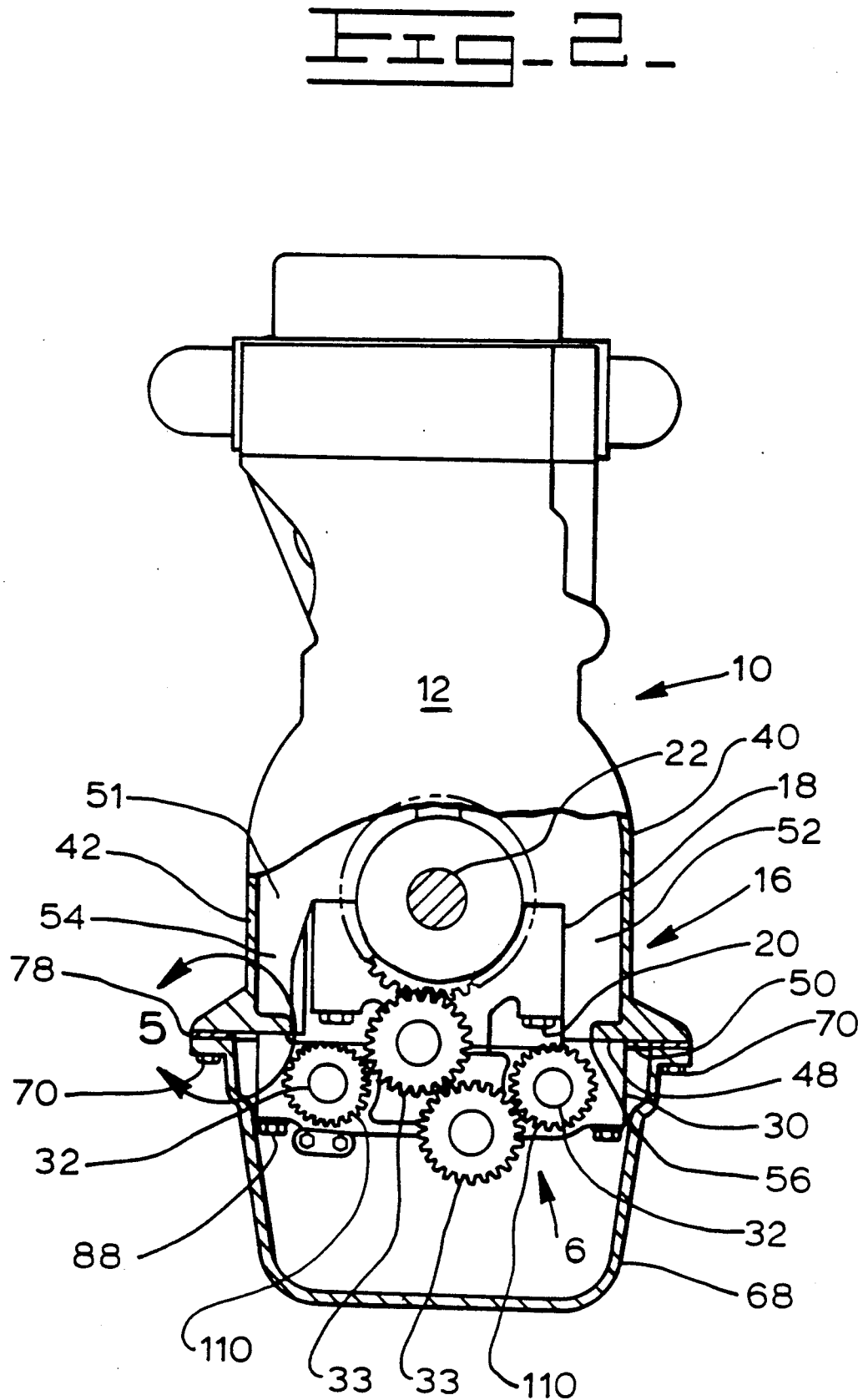
Fig_2_

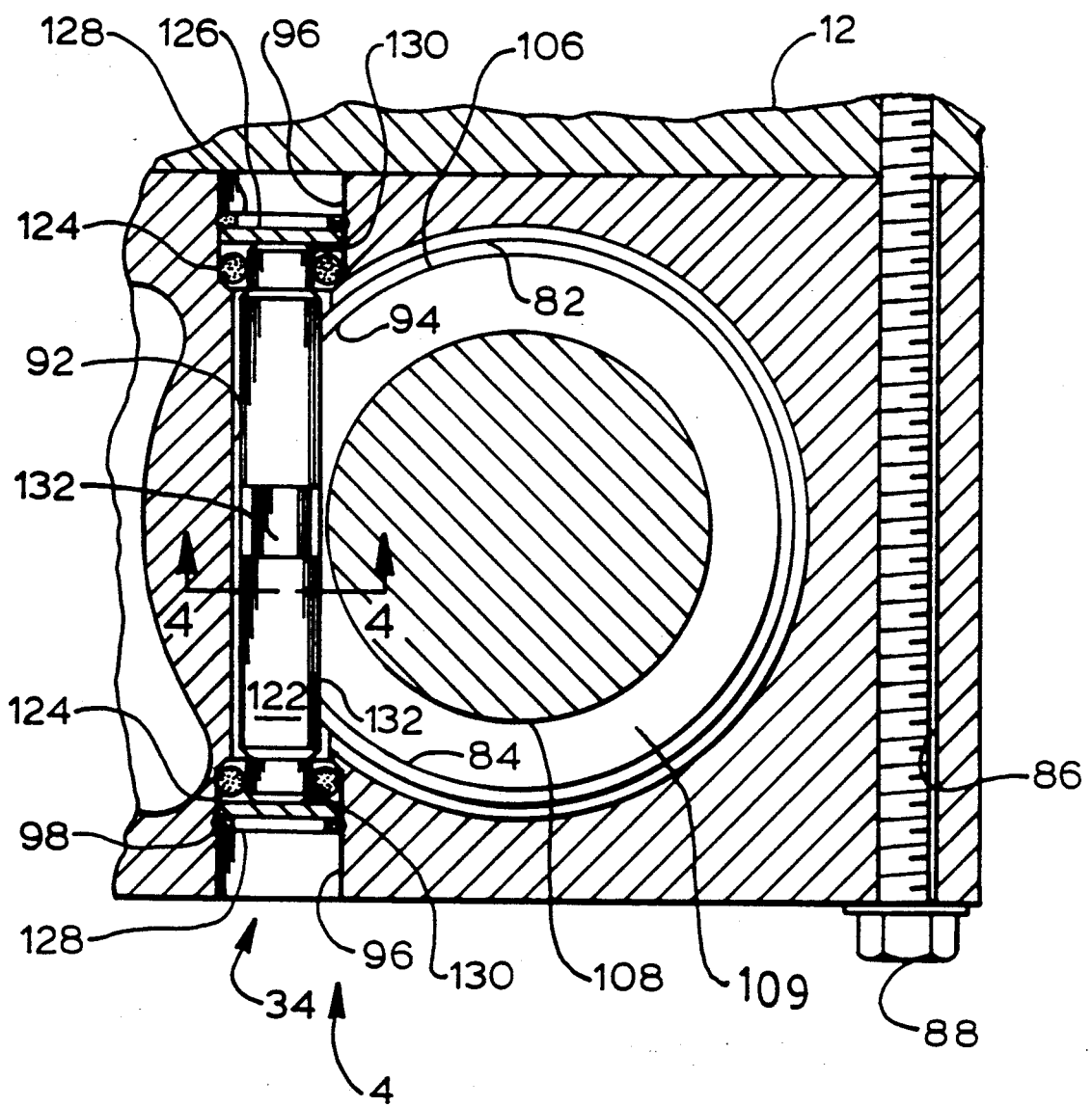
Fig_3_
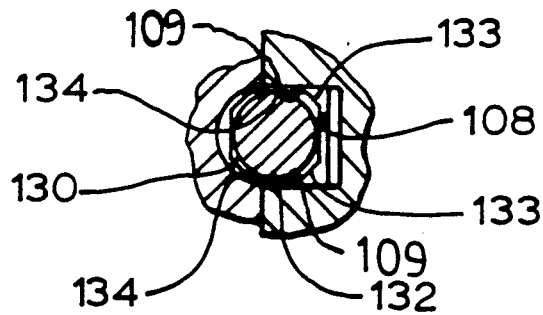
Fig_4_

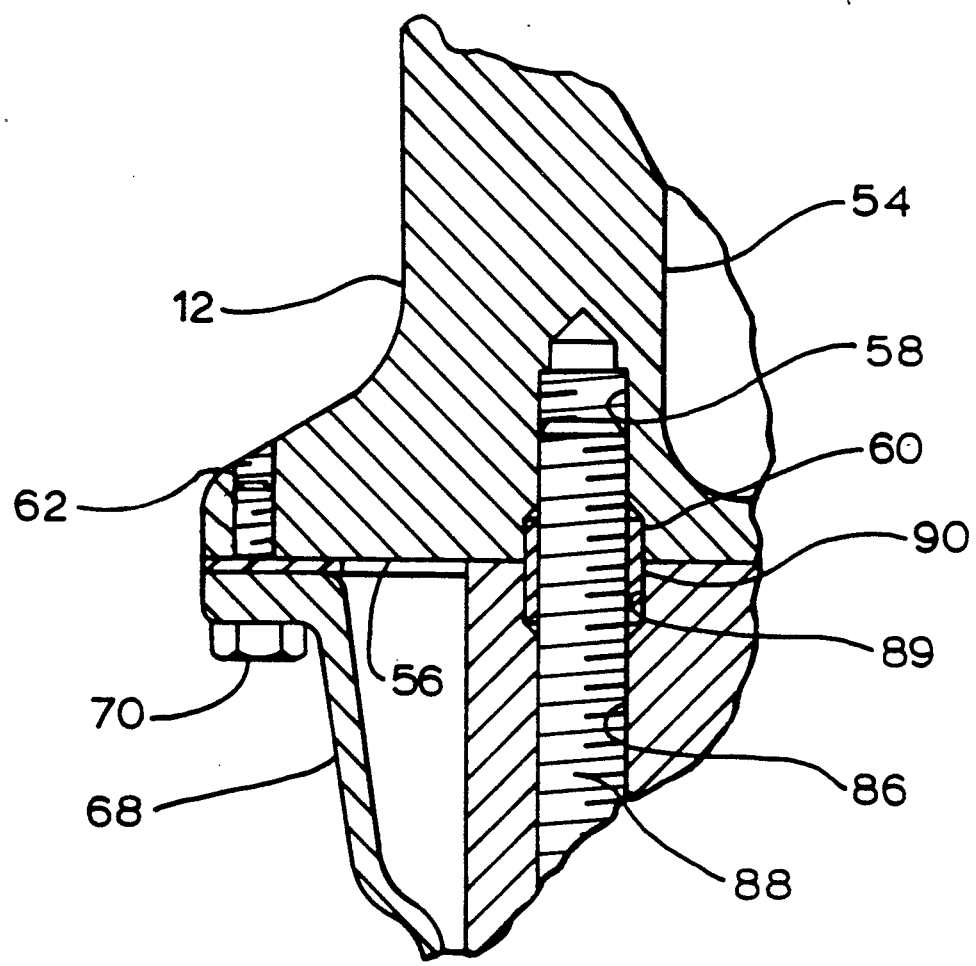
Fig_5_

ISOLATED THRUST PIN FOR USE WITH A ROTATING SHAFT

TECHNICAL FIELD

This invention relates generally to a thrust member for use with a rotatable shaft in an internal combustion engine, and more particularly to an improved thrust pin mounting for a balancing system by isolating the thrust pin and functionally isolating the axial loads between the rotating shaft and the shaft supports.

BACKGROUND ART

In a conventional four cylinder internal combustion engine, balancing of the secondary inertia forces is of a main concern. In many applications, a pair of axially positioned counter-rotating balancing shafts are used to cancel the secondary forces. The secondary forces are produced by the piston and the connecting rod connected to the crankarms of the crankshaft. These forces are basically reciprocation forces and are essentially directed in a vertical plane. They are brought into existence by the angularity of the connecting rod and the varying ratio of the rod to the crankarm length and these forces are produced at a rate of twice the frequency of the engine speed. Accordingly, these forces are considered forces of secondary order since their frequency is twice that of the engine speed with the secondary forces being twice the frequency of the primary forces. The secondary forces operate in the same direction and each crankarm and connection rod produces forces of the same magnitude and in the same direction. The result of the secondary forces in a four cylinder engine of this design is four times the forces of any one cylinder in the engine. Accordingly, the unbalanced secondary forces, gas loads and minor manufacturing imperfections can develop a considerably resultant of force which cause the entire engine to vibrate, roll, pitch and yaw and a balancing system is normally incorporated in the engine.

In addition to the internal engine generated forces, external forces are applied to the engine. For example, when the engine is used to power a piece of earthmoving equipment impact forces from the working of the equipment are transmitted to the engine. These forces may be transferred in a direction axial to the balancer shaft whereas internal forces are normally transferred perpendicular to the rotational direction of the shaft. The shafts of such balancers are normally constrained in an axial direction by a rigid member which transfers these impact loads from the machine to the balancing system. One such positioning member is disclosed in U.S. Pat. No. 4,425,821 issued to Floyd G. West on Jan. 17, 1984. The shaft is rigidly positioned in a housing by a washer and snap ring combination at one end and a gear and screw combination at the other end.

Another example of a rigid positioning system is disclosed in Caterpillar Parts Book for a 3304 Industrial Engine published in July of 1978 and shown on pages 23 and 25. The balancing shafts are positioned in the block by a pair of plates secured to the block and positioned in grooves in the shafts.

Thus, what is needed is a positioning system or an isolating device that can isolate both internally and externally induced forces from the balancer system or a rotating shaft. Furthermore, the device must be able to resist wear and provide adequate service life.

DISCLOSURE OF THE INVENTION

In one aspect of the present invention, an isolating device is adapted for use in a balancing system of an engine. The engine has a block including a plurality of cylinder bores therein, a piston and an associated connecting rod movably positioned in each of the bores and a crankshaft which rotates to reciprocate the piston and connecting rod in each cylinder thereby generating periodic unbalanced forces with each rotation of the crankshaft. The device comprises a plurality of bearing supports attached to the block, a pair of counter-rotating balancing shafts rotatably positioned in each of the supports and drivingly connected to the crankshaft and means for isolating axial loads imposed on each of the balancing shafts.

In another aspect of the present invention, a balancing system of an engine which has a block and a crankshaft rotatably positioned in the block is claimed. The system comprises a plurality of bearing supports attached to the block, a pair of balancing shafts rotatably positioned in each of the supports and drivingly connected to the crankshaft, and means for absorbing axial loads induced into each of the balancing shafts.

The present invention provides a balancing device or system which is simple, inexpensive and solves the problem of axial loads being introduced into the balancing shafts used with an engine. The device isolates the axial loads between the block and the shafts and prevents excessive wear between rotating and stationary components.

BRIEF DESCRIPTION OF THE DRAWINGS

FIG. 1 is a side view of an engine embodying the present invention with portions shown in section for illustration convenience.

FIG. 2 is an end view of an engine embodying the present invention with portions shown in section for illustration convenience.

FIG. 3 is and enlarged cross-sectional view taken along line 3—3 of FIG. 1, a portion of the support in which one of the rotating shafts and an isolating device are illustrated.

FIG. 4 is a cross-sectional view taken along line 4—4 of FIG. 3.

FIG. 5 is an enlarged cross-sectional view taken along line 5 of FIG. 2.

BEST MODE FOR CARRYING OUT THE INVENTION

Referring to FIGS. 1 through 5, an isolating device 4 is adapted for use in a balancing system 6 of an internal combustion engine 10. The internal combustion engine 10 includes a cylinder block or housing 12 having a plurality of cylinder bores 14 therein, a crankshaft mounting means 16 which includes a plurality of main bearing caps 18 removably attached to the cylinder block 12 by a plurality of bolts 20. A crankshaft 22 is rotatably connected to the cylinder block 12 by the plurality of main bearing caps 18. A plurality of piston and connecting rod assemblies 24, are rotatably connected to the crankshaft by a plurality of connecting rod bearing caps 26 and a plurality of bolts 28. The isolating device 4 includes a plurality of individual bearing supports 30 removably attached to the block 12, the supports 30 could be formed as a part of the cylinder block or housing 12 or as an integral plurality of bearing supports having a ladder configuration. The isolating ice 4 further includes a pair of counter-rotating balancing shafts 32 drivingly connected to the crankshaft 22 by a pair of gears 33 (see FIG. 2) and means 34 for isolating axial loads introduced into each of the balancing shafts 32. As a further alternative the isolating device 4 could be used in a transmission or other mechanism (not shown) having a rotating shaft 32 therein.

The cylinder block 12 further includes a pair of elongate, spaced apart sidewalls 40,42 which extend below and are elevationally, downwardly spaced from the crankshaft mounting means 16. The block further includes a pair of opposite ends 44,46. An outer mounting surface 48 is defined along a lower edge or bottom 50 of the sidewalls 40,42 of the cylinder block 12. The crankshaft mounting means 16 is integral with the block 12 and is in elevationally, upwardly spaced relation to the outer mounting surface 48. A plurality of longitudinally spaced integral struts 51 bridge between the thin sidewalls 40,42. Each of the struts 51 has a pair of laterally spaced apart legs 52,54 extending downwardly from the crankshaft mounting means 16 toward the lower edge 50 of the cylinder block 12. An inner mounting surface 56 is provided at the bottom of each of the legs 52,54 near the lower edge 50 of the block 12. In the specific embodiment shown, the inner mounting surfaces 56 and the outer mounting surfaces 48 lie on the same horizontal plane but as an alternative could be disposed on different horizontal planes. Each of the legs 52,54 has a threaded hole 58 therein extending upwardly from the inner mounting surface 56. Each of the threaded holes 58 further has a portion 60 of the hole which is enlarged to a diameter greater than the threaded portion and has a predetermined depth. The cylinder block 12 has a plurality of threaded holes 62 therein extending upwardly from the outer mounting surface 48.

An oil pan 68 is removably attached to the cylinder block 12 by a plurality of bolts 70 in engagement with the threaded holes 62 in a conventional manner. The oil pan 68 has a lubrication retaining bowl portion 72 near one end, an upper portion 74 and a lip or flange 76 about the upper portion 74. A gasket 78 is sealingly interposed between the lip 76 and the outer mounting surface 48 of the block 12.

As further shown in FIG. 2, the balancing system 6 includes the pair of counter-rotating shafts 32 and the plurality of individual bearing supports 30 are removably attached to the block 12. The individual supports 30, in this specific embodiment, are ductile iron castings including an elongate rectangular body having a thickness, length and width in which the length is greater than the width. A pair of spaced through bores 82 are axially aligned with each other in each of the supports 30 and a pair of bearings 84 are non-rotatably positioned in the bores 82 in each of the supports 30 and rotatably support the pair of counter-rotating shafts 32 therein. A pair of fastening holes 86 are positioned in each of the supports 30 and in this application are axially aligned with each of the threaded holes 58 in each of the corresponding legs 52,54. A plurality of bolts 88 extend through the the fastening holes 86 and removably attach the individual bearing supports 30 to the block 12. At least one of the fastening holes 86 has an enlarged diameter portion 89 at one end with a preestablished depth. A hollow dowel 90 has a portion thereof positioned in the enlarged diameter portion 89 and the remainder of the length of the hollow dowel 90 positioned in the enlarged diameter portion 60 of the threaded hole 58. At least one of the individual bearing supports 30 has a through hole 92 therein which intersects one of the bores 82. The corresponding bearing 84 which is positioned in this bore 82 has a portion 94 cut away therefrom to align with the through hole 92. In the specific embodiment shown, each of the individual bearing supports 30 includes the through hole 92. Each of the through holes 92 has an enlarged diameter portion 96 with a predetermined depth at each end thereof. The enlarged diameter portion further includes a retaining groove 98 therein.

Each of the counter-rotating shafts 32 in this embodiment are generally cylindrical and have an axis of rotation 100. Each of the shafts 32 includes a pair of unbalance weights 102 which are eccentric to the axis 100 and are displaced radially from the center of each shaft 32 while being positioned between the individual bearing supports 30. The shafts 32 further include a plurality of circular portions 104 corresponding to the number of supports 30 and each has a bearing surface 106 rotatably disposed in the bearings 84. Each of the shafts 32 has a groove 108 positioned in at least one of the circular portions 104. The groove 108 further includes a pair of contacting surfaces 109. In the instant application, each of the circular portions 104 has the groove 108 therein. As an alternative (not shown) the shaft 32 could include a flange having a pair of contacting surfaces thereon or the contacting surfaces 109 could be positioned at one or each end of the shaft 32. A gear 110 is attached at one end of each shaft 32 in a conventional manner and is drivingly connected to the crankshaft 22 of the engine 10.

As best seen in FIG. 3, one of the means 34 for absorbing axial loads introduced into one of the balancing shafts 32 is shown. The other portion of the isolating device 4 and the individual bearing support 30 is a mirror image and would include another means 34 for absorbing axial loads introduced into the other of the balancing shafts 32. The absorbing means 34 includes a thrust pin 122, a pair of resilient isolating members 124, a pair of plates 126 and a pair of retainers 128. The thrust pin 122 has a generally cylindrical shaped portion 130 at each end and has a centrally located generally square portion 132 with chamfered corners 133 thereon. The external surface of cylindrical portion 130 is smaller than the through hole 92. The square portion 132 includes a plurality of seating surfaces 134 (best shown in FIG. 4). The thrust pin 122 is positioned in the through hole 92 and the square portion 132 is positioned in the groove 108. As an alternative, the square portion 132 could be of any configuration such as hexagonal or rectangular which would maintain the functional characteristics of providing adequate contact area with the groove 108 and the seating surfaces 134 in the shaft 32 to maintain an oil film, prevent rotation of the thrust pin 122, and maintain easy assembly. In the specific embodiment shown the pair of isolating members 124 are elastomeric rings and are of an o-ring configuration having an inside and outside diameter but could be of another configuration such as a d-ring or square ring. The primary considerations in selecting an adequate o-ring 124 include selecting the proper stiffness of the elastomeric ring to prevent axial resonance of the system in the engine operating speed and insuring adequate life. On of the members or o-rings 124 is positioned with the inside diameter in contacting relationship around the cylindrical shaped portion 130 at each end of the thrust pin 122. The outside diameter of the o-ring 124 is position in contacting relationship with the enlarged diameter portion 96 of the bore 92 in the support 30. Each of the plates 126 is positioned in the enlarged diameter portion 96 of the bore 92 and relatively close or in contact with the end of the pin 1 22 Each of the retainers 128 is positioned in the retaining groove 98 and positions the o-ring 124 and thrust pin 122 in isolating functional relationship between each of the counter-rotating shafts 32 and the individual bearing supports 30. The pin 122 is designed to contact the bore 92 under high shock load conditions to prevent the o-ring 124 from receiving high strain.

INDUSTRIAL APPLICABILITY

The isolating device 4 is used to absorb axial loads induced into each of the balancing shafts 32. For example, assuming that an engine is used to power a piece of earthmoving equipment such as a track type loader. As the bucket of the machine is driven into a hard bank or into the roots of a stump an impact force is transmitted into an axial load through the bucket and frame into the engine and into the isolating device 4.

As best shown in FIG. 1, the load is transmitted from the side walls 40, 42 of the engine block 12, through the plurality of bolts 88 and into the individual bearing supports 30. As further shown in FIG. 3, the means 34 for isolating axial loads is housed in the bearing supports 30. The cylindrical portion 130 is smaller than the through hole 92 and permits movement of the thrust pin 122 relative to the hole 92 with the o-ring 124 providing a cushion action. The square portion 132 is positioned in the groove 108 to prevent the pin 122 from turning and one of the seating surfaces 134 contacts a portion of the groove 108 acting as a thrust surface. A film of lubrication oil is trapped between the square portion 132 of the pin 122 and the groove 108, thus, excessive frictional contact between the relative rotating parts is prevented increasing the life and serviceability of the pin 122 and isolating device 4. The outside diameter of the isolating member 124 is in contacting relationship to the enlarged diameter portion 94 and the inside diameter of the isolating members 124 is in contacting relationship to the pin 122. Thus, the axial loads induced into the individual supports 30 is at least partially absorbed in the isolating member 124 and further transmission of the axial load is reduced. Each end of the through bore 92 has one of the plates 126 positioned in the enlarged portion 96 and the retainer 128 is positioned in the retainer groove 98 to retain the pin 122 in the individual support 30 preventing the pin 122 and isolating members 124 from becoming dislodged or removed during the engine operation.

Other aspects, objects, and advantages will become apparent from a study of the specification, drawings and appended claims.

We claim:

1. An isolating device adapted for use in a balancing system of an engine having a block including a plurality of cylinder bores therein, a piston and connecting rod assembly movably positioned in each of the bores, a crankshaft which rotates to reciprocate the piston and connecting rod in each cylinder thereby generating periodic unbalanced forces with each rotation of the crankshaft comprising:
a plurality of bearing supports attached to the block;
a pair of balancing shafts rotatably positioned in each of the supports and drivingly connected to the crankshaft, one of the balancing shafts including a groove; and
means for absorbing axial loads introduced into each of the balancing shafts, said absorbing means including at least one isolating member which at least partially absorbs the axial loads induced into the individual supports and a thrust pin isolatingly mounted in one of the supports and engaging the groove.

2. The balancing device of claim 1 wherein the plurality of bearing supports include individual supports removably attached to the block.

3. The balancing device of claim 2 wherein three bearing supports are attached to the block, one near each end of the block and the other near the center of the block.

4. The balancing device of claim 1 wherein the block further includes a pair of elongate, spaced apart sidewalls each defining a mounting surface along a lower edge thereof and each of the bearing supports longitudinally spans the space between the sidewalls and has a mounting surface at each end and attaches to the mounting surface of the lower edge.

5. The balancing device of claim 4 wherein each of the bearing supports has a length greater than its width and includes a pair of spaced bores for receiving the balancing shafts.

6. The balancing device of claim 1 wherein the isolated mount includes a pair of resilient isolating members positioned at each end of the thrust pin.

7. The balancing device of claim 6 wherein the pair of resilient isolating members are elastomeric rings.

8. The balancing device of claim 1 wherein the plurality of bearing supports includes three bearing supports, one at each end of the block and the other near the center of the block and the absorbing means is positioned in the center support.

9. The balancing device of claim 1 wherein the thrust pin has a pair of circular end portions and a square center portion with the square center portion positioned in the groove of the the balancing shaft.

10. A balancing system of an engine having a block and a crankshaft rotatably positioned in the block comprising:
a plurality of bearing supports attached to the block;
a pair of balancing shafts rotatably positioned in each of the supports and drivingly connected to the crankshaft, one of the balancing shafts including a groove; and
means for absorbing axial loads introduced into each of the balancing shafts, said absorbing means including at least one isolating member which at least partially absorbs the axial loads induced into the individual supports and a thrust pin isolatingly mounted in one of the supports and engaging the groove.

11. The balancing system of claim 10 wherein the plurality of bearing supports include individual supports removably attached to the block.

12. The balancing system of claim 11 wherein each of the bearing supports has a length greater than its width and includes a pair of spaced bores for receiving the balancing shafts.

13. The balancing system of claim 11 wherein three bearing supports are attached to the block, one near each end of the block and the other near the center of the block.

14. The balancing system of claim 10 wherein the block further includes a pair of elongate, spaced apart sidewalls each defining a mounting surface along a lower edge thereof and each of the bearing supports longitudinally spans the space between the sidewalls and has a mounting surface at each end attaches to the mounting surface of the lower edge.

15. The balancing system of claim 10 wherein the isolated member includes a pair of resilient isolating members positioned at each end of the thrust pin.

16. The balancing system of claim 15 wherein the pair of resilient isolating members are elastomeric rings.

17. The balancing system of claim 10 wherein the plurality of bearing supports includes three bearing supports, one at each end of the block and the other near the center of the block and the absorbing means is positioned in the center support.

18. The balancing system of claim 10 wherein the thrust pin has a pair of circular end portions and a rectangular center portion with the rectangular center portion positioned in the groove of the balancing shaft.

19. A device for isolating axial forces introduced into a shaft, comprising:
 a housing having a plurality of bearing supports;
 the shaft being rotatably mounted in the bearing supports, said shaft including a groove; and
 means for absorbing axial loads introduced into the shaft including at least one isolating member which at least partially absorbs the axial loads induced into the individual support and a thrust pin isolatingly mounted in one of the supports and engaging the groove.

20. The device of claim 19 wherein the isolated member includes a pair of resilient isolating members positioned at each end of the thrust pin.

21. The device of claim 20 wherein the pair of resilient isolating members are elastomeric rings.

22. An isolating device adapted for use in a balancing system of an engine having a block including a plurality of cylinder bores therein, a piston and connecting rod assembly movably positioned in each of the bores, a crankshaft which rotates to reciprocate the piston and connecting rod in each cylinder thereby generating periodic unbalanced forces with each rotation of the crankshaft comprising:
 a plurality of bearing supports attached to the block, said plurality of bearing supports including individual supports removably attached to the block;
 a pair of balancing shafts rotatably positioned in each of the supports and drivingly connected to the crankshaft; and
 means for absorbing axial loads introduced into each of the balancing shafts.

* * * * *